United States Patent [19]
Wheeler et al.

[11] Patent Number: 5,458,227
[45] Date of Patent: Oct. 17, 1995

[54] PRODUCT PACKAGE INVERTING APPARATUS AND METHOD

[75] Inventors: Tracy E. Wheeler; Timothy J. Garrard, both of Terre Haute, Ind.

[73] Assignee: Digital Audio Disc Corporation, Terre Haute, Ind.

[21] Appl. No.: 375,930

[22] Filed: Jan. 20, 1995

[51] Int. Cl.$^6$ ................................................ B65G 47/24
[52] U.S. Cl. ........................................... 198/403; 198/402
[58] Field of Search .................................. 198/402, 403, 198/404, 406, 412, 413, 416

[56] References Cited

U.S. PATENT DOCUMENTS

| | | | |
|---|---|---|---|
| 3,275,122 | 9/1966 | Carlson | 198/403 X |
| 3,288,464 | 11/1966 | Thompson | 198/403 X |
| 3,567,008 | 3/1971 | Fischer | 198/402 |
| 3,679,070 | 7/1972 | Skiba, Jr. | 198/407 X |
| 3,874,740 | 4/1975 | Hurd | 198/402 X |

Primary Examiner—James R. Bidwell
Attorney, Agent, or Firm—Wood, Herron & Evans

[57] ABSTRACT

An inverting apparatus for inverting a product package being moved by a conveyor belt comprises an auxiliary conveyor having a pick-up end to receive the package from the conveyor surface and a discharge end located vertically above the pick-up end and the conveyor belt to discharge the package back onto the conveyor surface. The auxiliary conveyor moves the package along an inclined path from the pick-up end to the discharge end, and a fulcrum element at the discharge end horizontally spaced from the discharge end catches a forward end of the package and supports the package off center such that the package temporarily rocks on the fulcrum element and falls with a package trailing end falling forward of the package forward end to thereby invert the package as it is discharged back onto said conveyor belt.

23 Claims, 2 Drawing Sheets

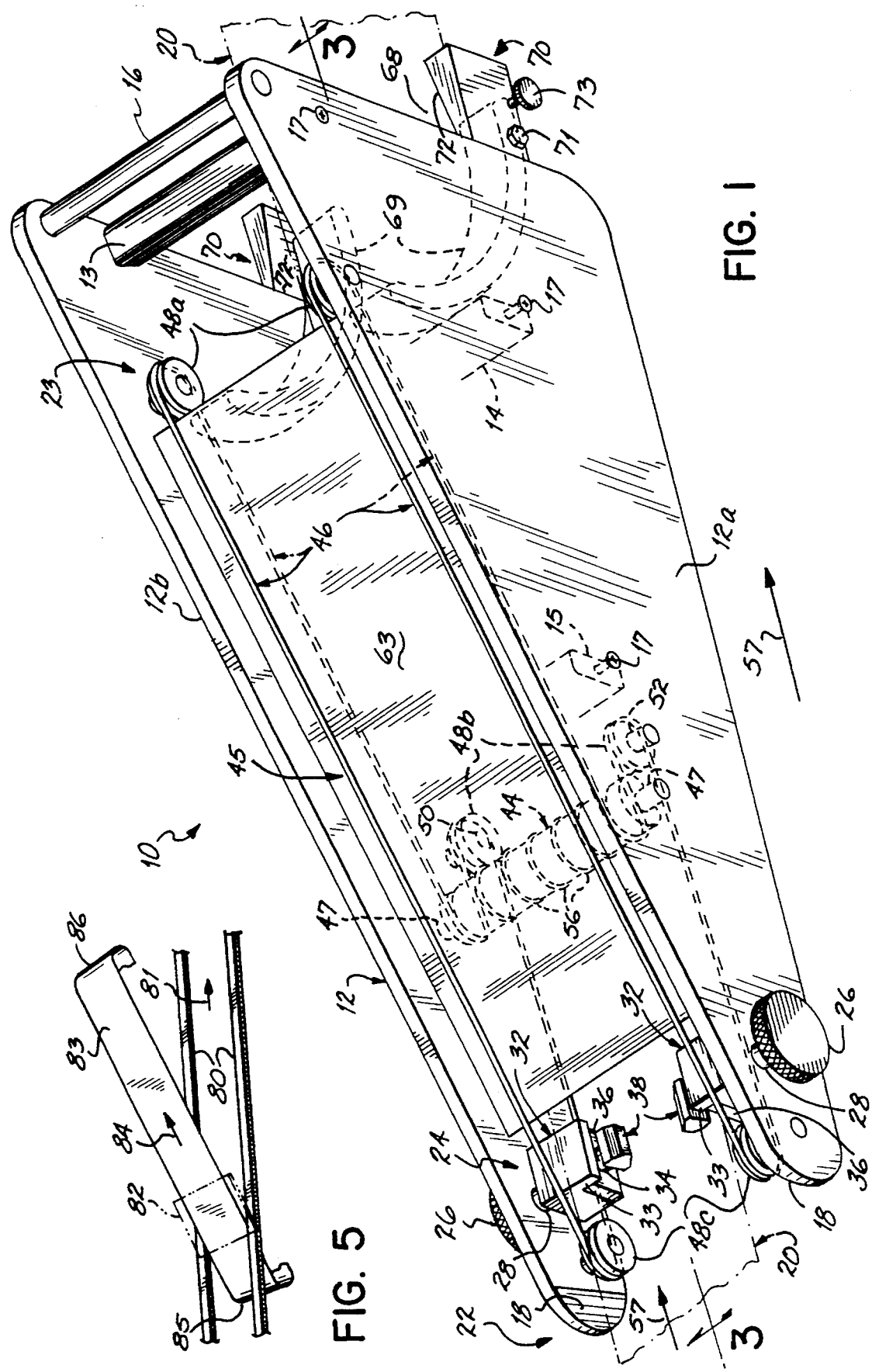

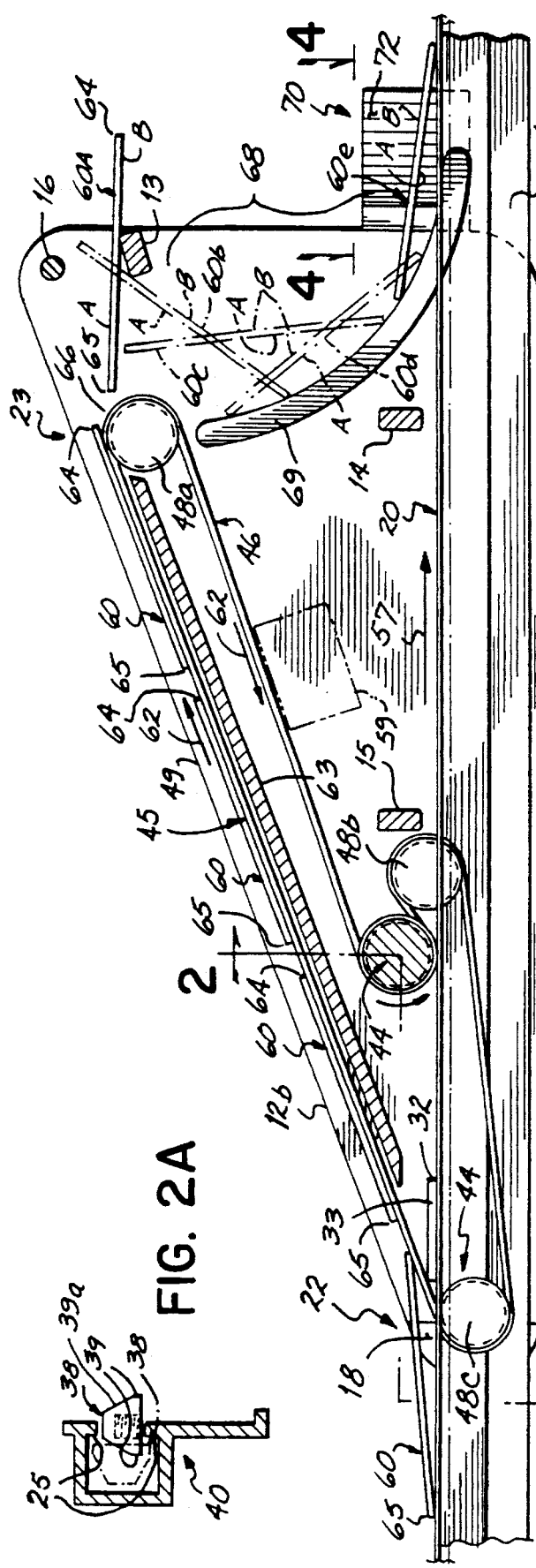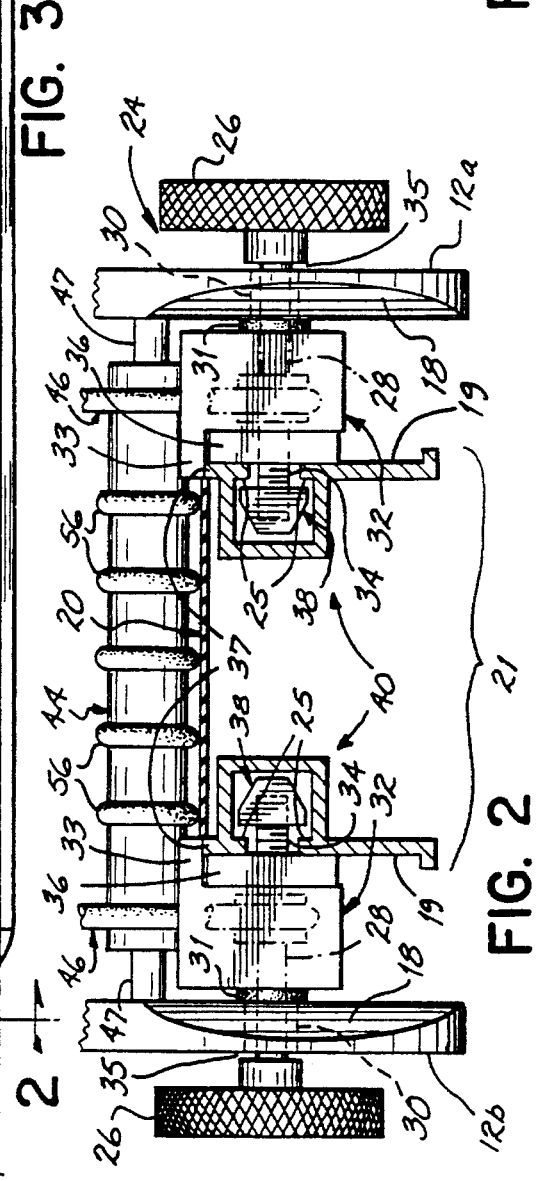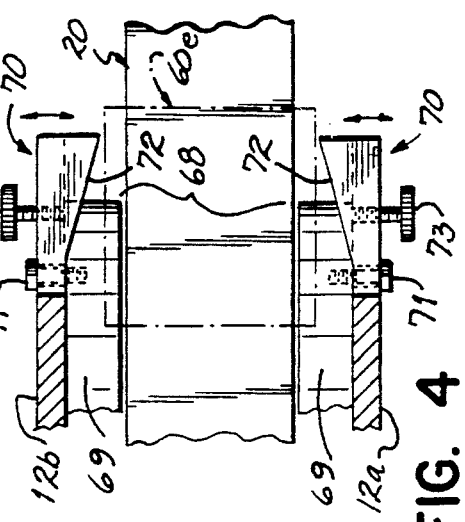

PRODUCT PACKAGE INVERTING APPARATUS AND METHOD

FIELD OF THE INVENTION

The present invention relates generally to package conveying and handling and specifically to an apparatus and method which inverts a product package as it is conveyed along a path by a conveyor.

BACKGROUND OF THE INVENTION

A variety of different products, such as compact musical discs and CD-ROM, are packaged in thin paperboard or plastic packages and sleeves. Generally, such CD packages are square or rectangular in shape. After the CD is inserted into the package, it is carried, lying flat, by a conveyor surface or belt to be further processed and shipped. Prior to shipping, the CD packages are usually labelled with graphics, text or a combination of both, and oftentimes, during such labelling, it is desirable to label both sides of the flat package. Since the flat packages lie on the moving conveyor belt has only its upper side exposed; its lower side is unexposed. If it is necessary to label the lower side, the package must be inverted during conveyance in order to place the previously unexposed lower side on top, that is, as the uppermost side.

In order to automatically invert such packages while they are conveyed, several complex mechanisms have been developed. One family of mechanisms includes a ferris-wheel type design which generally is positioned over top of a conveyor to lift packages from the conveyor then set them down again inverted or upside down. Other such mechanisms utilized twist-belt systems which lift the packages and twist them by belts in order to invert the packages. Such ferris-wheel designs and twist-belt systems usually require a combination of stepper motors, sensors, and electronic control logic to operate. Furthermore, such devices are generally expensive and complex in construction and operation and are time consuming to assemble within a conveying line and disassemble in order to be moved to another position along the line, when necessary. Still further, such mechanisms generally require external power sources and other external facilities further complicating their operation and increasing their cost.

Therefore, it is desirable to have a product package inverting apparatus which is less expensive and complex than currently existing mechanisms to thereby be more quickly and efficiently installed within a conveying line. Furthermore, it is desirable that the device be lightweight and readily moveable for optimal labelling flexibility. Still further, it is desirable to have an inverting apparatus which does not require its own drive motor, or complex combinations of stepper motors, sensors and control logic.

SUMMARY OF THE INVENTION

In accordance with the above-mentioned objectives, the inverting apparatus or inverter of the present invention utilizes a streamlined, non-complex mechanical design which is more compact and lighter in weight than currently existing package inverting mechanisms. The inverter is self-contained, relatively low cost, and is powered by the main conveyor, thereby dispensing with the need for a separate internal inverter drive. The design and operation of the inverter of the invention make it simple to utilize and generally maintenance-free and also provides for quick installation at any point along the main conveyor or for greater labelling flexibility.

More specifically, the inverter of the present invention is arranged in-line with a main conveyor which moves packages preferably by the use of a moving conveyor belt. In a preferred embodiment of the invention, the inverter is powered by the main conveyor belt. The inverter comprises a frame positioned adjacent the main conveyor belt. An auxiliary conveyor is movably mounted on the frame proximate the main conveyor belt. The auxiliary conveyor has a pick-up end which receives a package from the main conveyor belt and a discharge end which discharges the package back onto the main conveyor belt. The pick-up end is located below the surface of the main conveyor belt to smoothly receive the package from the main conveyor belt. The discharge end of the auxiliary conveyor is located at an elevation which is higher than the elevation of the pick-up end and higher than the surface of the main conveyor belt. The auxiliary conveyor is operable for moving along an upwardly inclined path from the pick-up end to the discharge end to thereby move the package from the main conveyor belt to the discharge end to be discharged at a point located vertically above the main conveyor belt.

A fulcrum element, preferably a horizontal bar, is positioned on the inverter frame at an elevation generally the same as the elevation of the discharge end and is horizontally spaced from the discharge end in the downstream direction of the moving main conveyor belt. As the auxiliary conveyor moves the package on the inclined path, the fulcrum element catches a forward end of the package as it is conveyed by the auxiliary conveyor to the end of the inclined path. The package is transferred from the auxiliary conveyor to the fulcrum element. The fulcrum element temporarily supports the moving package off center until the trailing end of the package moves off of the discharge end. The package then rocks temporarily on the fulcrum element and falls rearwardly from the fulcrum element under the influence of gravity such that the package trailing end falls forward of the package forward end to thereby invert the package as it is discharged back onto the main conveyor belt. The fulcrum element is horizontally spaced from the discharge end generally less than the distance between the forward and trailing ends of the package, but preferably greater than approximately fifty percent (50%) of that distance to ensure that the package is off center on the fulcrum element and falls rearwardly to be inverted. If the speed of the auxiliary conveyor is such that it throws the package from the discharge end a certain distance, then the fulcrum may need to be spaced to account for that distance, and may be spaced from the discharge end greater than the length of the package. Preferably, the present invention is configured to move the package along at 50 feet per minute.

As the package falls rearwardly from the fulcrum element and is inverted, a deflector chute, in the form of two curved deflector strips which straddle the main conveyor belt below the discharge end, catch the falling trailing end and guide the trailing end forward of the forward end. A pair of package guides at the downstream end of the deflector chute center the inverted package back on the main conveyor belt.

In a preferred embodiment of the invention, the auxiliary conveyor includes a pair of continuous parallel conveying belts or bands which move on pulleys carried by the inverter frame. The bands are coupled to a rotary drive roller which is in frictional contact with the moving surface of the main conveyor belt such that movement of the main conveyor belt rotates the roller and drives the bands. Thereby, the main conveyor belt provides the necessary power for the auxiliary conveyor. The parallel bands straddle the main conveyor belt, one on either side of the main conveyor belt, so that the pick-up end of the auxiliary conveyor may be positioned below the surface of the main conveyor belt. Alternatively, the main conveyor surface might include two parallel belts which straddle a single conveyor belt of the inverter.

The inverter is positioned by attaching the frame to a rigid frame member of the main conveyor with a coupling mechanism located on the frame proximate the pick-up end of the inverter. The loading end coupling mechanism provides a pivoting point for the inverter such that the weight of the inverter holds the rotary drive roller thereof firmly against the upper moving surface of the main conveyor belt to prevent slippage. The coupling mechanism utilizes guides which are inwardly adjustable with respect to the frame of the inverter in order to center the auxiliary conveyor of the inverter over the main conveyor belt for a proper operation.

The above and other objects and advantages of the present invention shall be made more apparent from the accompanying drawings and the detailed description thereof.

BRIEF DESCRIPTION OF THE DRAWING

The accompanying drawings, which are incorporated in and constitute a part of this specification, illustrate the preferred embodiment of the invention and, together with a general description of the invention given above, and the detailed description of the embodiments given below, serve to explain the principles of the invention.

FIG. 1 is a perspective view of the inverter of the present invention mounted in-line along the main conveyor belt of a packaging system;

FIG. 2 is a cross-sectional view along lines 2—2 of FIG. 3 illustrating coupling of the inverter to the main conveyor belt;

FIG. 2A is a cross section of one track of the main conveyor frame showing the side installation of elongated track nuts.

FIG. 3 is a side cross-sectional view along lines 3—3 of FIG. 1 showing the inverter inverting a product package.

FIG. 4 is a cross-sectional view along lines 4—4 of FIG. 3 showing end guides;

FIG. 5 is a perspective view of an alternative embodiment of the present invention.

DETAILED DESCRIPTION OF SPECIFIC EMBODIMENTS

The package inverter 10 of the present invention is placed in-line with a main conveyor 21 which includes a main conveying surface, such as a main conveyor belt 20. Inverter 10 inverts the packages on belt 20 as they progress along the conveyor 21 in a machine direction designated by arrow 57 (see FIGS. 1 and 3). Referring to FIG. 2, conveyor 21 has a frame 19 which includes two, stationary, opposing, parallel tracks 40. The parallel tracks 40 are channel shaped and include extension portions 37 which define a groove in which the main conveyor belt 20 moves. The inside surfaces 25 of the longitudinally slotted outside walls of tracks 40 capture nuts 38 to secure the inverter 10 to the main conveyor 21 as described in greater detail hereinbelow. It will be appreciated that conveyor 21 may have a different frame structure than shown, and the inverter 10 may be adjusted or modified to be utilized with the different conveyor in accordance with the principles of the present invention. The main conveyor belt is driven in the direction of arrow 57 by means not shown.

FIG. 1 illustrates the package inverting apparatus or package inverter 10 of the present invention. Inverter 10 includes a frame 12 with a right side frame member 12A and left side frame member 12B. The frame members 12A, 12B are generally triangular in shape and are held together primarily by a series of rectangular tie bars 13, 14, and 15 as well as a circular tie bar 16. The tie bars are connected to the frame members 12A, 12B with appropriate fasteners such as screws 17. Frame 12 is elongated and is configured to be positioned over the main conveyor belt 20, of conveyor 21 (see FIG. 3) having a stationary frame 19. Inverter 10 includes an auxiliary conveyor 45 in the form of two, continuous, parallel conveyor belts or bands 46. The auxiliary conveyor 45 receives product packages from the moving main conveyor belt 20 at a pick-up end 22 and carries the packages up an inclined path to an discharge end 23 where they are dropped back onto conveyor belt 20 (see FIG. 3). Before being discharged back onto conveyor belt 20, the product packages are effectively inverted to expose another side or face of the package as will be discussed in greater detail hereinbelow. Therefore, inverter 10 is placed in-line with a package conveyor 21 for inverting product packages without need to disrupt or interrupt the path of the main conveyor belt 20. Proximate the pick-up end 22 of inverter 10, the frame members 12A, 12B have respective outwardly flaring, or tapered, portions 18 for capturing packages as they move along conveyor belt 20 in the direction of arrow 57.

FIG. 2 illustrates a coupling mechanism 24 of inverter 10 which couples the inverter to the frame 19 of conveyor 21. On both sides of frame 12 the inverter includes a rotatable adjustment knob 26 connected to a shaft 28 which extends through a bronze bushing 30 allowing the respective frame members 12A, 12B to rotate around shaft 28. Shaft 28 extends through a spacer guide 32. Shaft 28 includes a threaded end 34 which extends through another spacer 36 and into an elongated threaded nut 38.

As shown in FIG. 2, the main conveyor frame 19 includes two stationary opposing, parallel channel-shaped tracks 40 which receive nuts 38 therein. Depending upon the threading of the nut 38 and the end of shaft 28, rotation of knob 26 and shaft 28 will pull nut 38 outwardly from the track 40 until nut 38 abuts against the inside surface 25 of the longitudinally slotted outside wall of track 40. A portion of track 40 is thereby held between nut 38 and spacer 36 to secure the respective frame elements 12A, 12B of inverter 10 to conveyor tracks 40. Spacer guide 32 includes a lip 33 which is positioned adjacent a side of conveyor belt 20. Spacer guide 32 and lip 33 ensure that the inverter 10 is centered on main conveyor frame 19 and over top of main conveyor belt 20 by spacing the frame members 12A, 12B equally from belt 20 and the respective tracks 40.

To slide inverter 10 to a different position along conveyor frame 19 or belt 20, knobs 26 are loosened to loosen nuts 38 in tracks 40. The inverter 10 is then lifted at it's discharge end 23, such as by grasping tie bar 13 or 16, to pivot the inverter 10 about shaft 28 so that it may be dragged or pushed to another position along conveyor 21. To ensure smooth pivoting of the frame members 12A, 12B relative shaft 28, bushing 30 has a flange 31 which is positioned between the frame members and the respective spacer guides 32. Further, shaft 28 is preferably dimensioned in length such that a gap 35 exists between the frame members and their respective knobs 26. Thereby, inverter 10 may be quickly and easily positioned on the conveyor 21 and then readily moved to another position on the conveyor, such as to accommodate a greater number of labelling or packaging devices before or after inverter 10.

In the preferred embodiment of the invention, the elongated nuts 38 are shaped to be placed in tracks 40 from the sides as well as from the ends of the tracks. As illustrated in FIG. 2A, the nuts 38 are generally trapezoidal in transverse cross-section and have flattened side edges 39 and 39a. The nuts may be slid into tracks 40 in an upright position and then rotated as illustrated in phantom in FIG. 2A to receive shaft 28 which includes threaded end 34 and to be tightened against surfaces 25 of the outside walls of tracks 40. The trapezoidal portion flattened edges 39a ensure that nuts 38 may be rotated within tracks 40.

Therefore, the inverter 10 may be quickly and easily installed at any position along the length of conveyor belt 20 to invert product packages. Furthermore, the inverter 10 may be easily removed from one conveyor position and quickly repositioned simply by loosening knobs 26 and moving the inverter 10 along conveyor belt 20 to another position to handle a variety of different labeling techniques. The coupling mechanism 24 also acts as a pivot point for inverter 10 so that the drive mechanism of the inverter engages the moving conveyor belt 20 and is driven thereby for conveying the product package from the pick-up end 22 to the discharge end 23 of the inverter without an external power source as will now be described.

Referring to FIG. 1, the drive mechanism of inverter 10 includes a drive roller 44 which extends between frame members 12A and 12B. Drive roller 44 rotates by an axle piece 47 and drives the auxiliary conveyor 45 to move a package along the inverter 10. Axle piece 47 is pressed into a bearing (not shown) housed in frame 12 allowing roller 44 and piece 47 to rotate which in turn drives belts 46. In a preferred embodiment, auxiliary conveyor 45 includes two parallel, spaced conveyor belts 46 which are driven around a series of idler pulleys 48 which are coupled to and supported by frame members 12A, 12B with aircraft bearings 50. The bearings 50 and the idler pulleys 48 are held spaced apart from the respective frame members 12A and 12B by spacers 52 so that belts 46 do not contact or rub against the frame members 12A, 12B. The idler pulleys 48 are arranged such that upper, conveying portions of the belts 46 move at an incline along an upwardly sloping top side 49 of triangular frame 12 (see FIG. 3). For example, idler pulley pair 48A is located above pulley pair 48B proximate drive roller 44 which are, in turn, located above pulley pair 48C proximate the pick-up end 22 of the auxiliary conveyor 45 of inverter 10. When drive roller rotates counterclockwise as shown in FIG. 3, belts 46 move along at an inclined path from the pick-up end 22 to the discharge end 23 in the direction of arrow 62. Belts 46 fit into end grooves (not shown) formed within drive roller 44. The belts 46 are thus frictionally driven by roller 44.

In accordance with the principles of the present invention the auxiliary conveyor 45 of inverter 10 carries a product package from a pick-up end 22 to a discharge end 23. The pick-up end 22 is preferably positioned below the surface of the main conveyor belt 20, as illustrated in FIG. 3, in order to ensure a smooth transition form main conveyor belt 20 to the auxiliary conveyor belts 46. At pick-up end 22 of the auxiliary conveyor 45, the package 60 is transferred from belt 20 to the parallel auxiliary conveyor belts 46. Discharge end 23 is positioned at an elevation vertically above the pick-up end 22 and vertically above the surface of conveyor belt 20 as shown in FIG. 3. Discharge end 23 is also spaced horizontally downstream of pick-up end 22 in the direction of arrow 57. The auxiliary conveyor belts 46 move package 60 along an upwardly inclined path in the direction of arrow 62 from the main conveyor belt 20. The package 60 is then discharged from discharge end 23 from an elevated position back onto main conveyor belt 20 and is inverted over a fulcrum as it is discharged as discussed in greater detail below.

In one embodiment of the invention, the main conveyor 21 has single conveyor belt 20 and the inverter 10 includes two parallel auxiliary conveyor belts 46 which are spaced apart when the inverter 10 is positioned in-line with the main conveyor 21. The auxiliary conveyor belts 46 are positioned one on either side of belt 20 so as to straddle the main belt 20. With the belts 46 straddling belt 20 as such, the pick-up end 22 may be positioned below the surface of belt 20 for a smooth translation as discussed above. In an alternative embodiment of the present invention, the main conveyor 21 may utilize two parallel conveyor belts similar to belts 46 while the inverter 10 might utilize a single belt similar to belt 20. Referring to FIG. 5, parallel belts 80 are part of a main conveyor (not shown) and move in a generally horizontal path indicated by arrow 81. Belts 80 carry a package 82 to be inverted similar to package 60 in FIG. 3. At a pick-up end 85 positioned below the surface of belts 80, an auxiliary conveyor belt 83 engages package 82 and lifts the package from belts 80. The auxiliary conveyor belt 83 moves package 82 along an upwardly inclined path designated by arrow 84 to a discharge end 86 where the package is discharged and falls back onto belts 80. As seen in FIG. 5, the main conveyor belts 80 straddle the auxiliary conveyor belt 83.

Preferably, the speed of the auxiliary belts 46 is synchronized with the speed of the main belt 20 in order to ensure that their is no delay as package 60 is picked up off of the conveyor belt 20 by belts 46 at pick-up end 22. In a preferred embodiment of the invention, the speed of the auxiliary conveyor belts 46 is approximately 2 feet per minute faster than the speed of belt 20 to ensure that there is no backup of packages at the pick-up end 22. Any gap increase between the packages introduced by the faster auxiliary belts is generally removed when the package is discharged from the discharge end and falls over the fulcrum. Preferably, the present invention is configured to move the package along the inverting apparatus at 50 feet per minute.

As illustrated in FIGS. 1 and 3, drive roller 44 is positioned to contact main conveyor belt 20 when the inverter 10 is fixed in-line to conveyor 21. Drive roller 44 rests on moving conveyor belt 20. The drive roller 44 includes a plurality of small friction belts 56 at positions along its length to frictionally engage belt 20 (see FIG. 2). The roller belts 56 circumferentially surround roller 44 and ensure that the roller smoothly engages the moving belt 20 without slippage to thereby ensure smooth operation of the auxiliary conveyor belts 46. As illustrated in FIGS. 2 and 3, the coupling mechanism 24 of inverter 10 fixes the frame 12 to the conveyor frame 19 with the rotational shafts 28 located below the level of the conveyor belt 20. In that way, inverter 10 is pivoted by its own weight around the shafts 28 and at a point below belt 20 to thereby hold drive roller 44 downwardly securely against belt 20. Thus, the present invention further insures smooth frictional engagement of roller 44 and belt 20. When belt 20 moves in the direction of arrow 57, drive roller 44 rotates counter clockwise and moves belts 46 clockwise with respect to inverter frame 12 as indicated by arrows 62 in FIG. 3. Therefore, inverter 10 is operated without any external or peripheral power source for driving belts 46, reducing the manufacturing cost of inverter 10 as well as reducing the complexity of its assembly and operation and its overall weight. Of course, a motor 59 might be coupled to belts 46 by means not shown in order to drive the belts (see FIG. 3).

Proximate the discharge end 23, the connecting tie bar 13 acts as a fulcrum element to produce inversion of a product package as it is being discharged from discharge end 23 and back onto main conveyor belt 20. With reference to FIG. 3, a product package, such as a CD package 60, moves along main conveyor belt 20 to the position of the package inverter 10. The pick-up ends 22 of the auxiliary belts 46 engage package 60 and the rotating, inclined belts 46 lift package 60 away from conveyor belt 20 and onto the inverter. Movement of conveyor belt 20 turns drive roller 44 which moves the belts 46 in the direction of reference arrows 62 and thereby moves package 60 along an upwardly inclined path to discharge end 23. A flat guard plate 63 lies parallel to the inclined portions of auxiliary belts 46 and is secured to frame 12 to support package 60 from below. Plate 63 extends between the parallel belts 46 so as not to interfere therewith.

The package 60 to be inverted is indicated at various stages of its travel along the inverter, and thus, the reference numeral 60 will be utilized to describe the package from the pick-up end 22 to the discharge end 23 of the inverter 10. The frictional engagement of belts 46 with package 60 move the package up the inclined path above guard plate 63 in the direction of arrow 62. Package 60 has a forward end 64 and a trailing end 65, and the package 60 moves up the inclined path to the downstream end the inclined belt portions, indicated by reference numeral 66 proximate the discharge end 23. As package 60 passes off end 66 of the inclined belts, the forward end 64 of the package is captured and supported by tie bar fulcrum element 13 and is supported thereby until the trailing end 65 of package 60 moves off of the downstream end 66 of the belts 46. To illustrate the inversion of package 60, the upward face of the package has been indicated by the letter A and the lower surface by the letter B.

As more clearly illustrated at the discharge end 23, fulcrum element 13 is located at a position vertically above conveyor belt 20 at approximately the same elevation above belt 20 as the discharge end 23 and idler pulley pair 48A and the downstream end 66 of the inclined belts 46. When package 60 moves entirely off of the downstream end 66 of the inclined belts, the package 60 is transferred to the fulcrum element 13 which supports package 60 slightly off center as indicated by the package with reference numeral 60A. Momentarily, package 60A will span between downstream end 66 of conveyor belts 46 and fulcrum element 13. That is, the package momentarily rocks on the fulcrum for a very short time, generally not more than a couple tenths of a second and usually less than a tenth of a second. However, after the trailing end 65 passes the downstream belt end 66, package 60A begins to fall backward under the influence of gravity as indicated by package positions 60B, 60C and 60D which show the progression of the falling package. Fulcrum element 13 is spaced horizontally from downstream end 66 of the belts 46 a distance generally less than the length between the forward end 64 and trailing end 65 of package 60 but also a distance generally equal to or greater than approximately fifty percent (50%) of the length of the package measured between the forward and trailing package ends. This ensures that package 60 is supported off center and that the weight of package 60 causes it to fall rearward between end 66 and fulcrum element 13. The spacing between fulcrum element 13 and downstream end 66 should be maintained to ensure a rearward fall of the package. If the speed of the auxiliary conveyor is such that it throws the package from the discharge end a certain distance, then the fulcrum may need to be spaced to account for that distance, and may be spaced from the discharge end greater than the length of the package. As the package 60 falls, the trailing end 65 falls downwardly and forwardly of the forward end 64 as illustrated by package positions 60C and 60D. In doing so, the package flips over and the upward face surface A becomes a downward face surface and the previous downward face surface B is now an upward face surface as illustrated by package 60E.

Inverter 10 includes a deflector chute 68 including opposing arcuate deflector strips 69 which carry the falling package and guide it around to an inverted position. The arcuate deflector strips 69 extend from proximate the discharge end 63 to a position downstream of the discharge end, as illustrated in FIG. 3. The inverted package 60E then slides off deflector chute 68 and onto the moving conveyor belt 20 and continues on the conveyor belt as it had previously, except it is inverted so that the previous downward face surface may have labeling or other indicia applied thereto. The upper surface of the fulcrum element 13 is slightly downwardly tilted in a rearward direction in order to insure that package 60A rocks on fulcrum element 13 and falls rearwardly into the deflector chute 68.

Inventer 10 includes end guides 70 which center the inverted package 60E on the belt 20. Referring to FIG. 4, plastic guides 70 are fixed to the arcuate deflector strips 69 with screws 71. The guides 70 have a tapered inward side 72 which force the side edges of the package 60E inwardly to center the package on main belt 20. An adjustment screw 73 is threaded into a helicoil (not shown) in each guide 70 and presses against the respective deflector strip 69 to flex the plastic guide 70 outwardly or to allow it to return to an inward position, depending upon how the operator deems that the package 60E should be centered.

Inverter 10 of the present invention provides inversion of a package with a mechanism which is less complex and less expensive than currently existing mechanisms for providing a similar function. Furthermore, inverter 10 is readily moveable within the package conveying system by loosening knobs 26 and sliding inverter 10 along the frame 19 of the conveyor 21. The inverter is lightweight and is generally maintenance free because it does not utilize any external drive mechanisms nor a complex combination of stepper motors, sensors or control logic. Further inverter 10 quickly and efficiently inverts packages and discharges the inverted package back onto a main conveyor belt with minimal disturbance of their progression through the packaging system. Further, no interruption or discontinuity of the main conveyor is required.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Accordingly, departures may be made from such details without departing from the spirit or scope of applicant's general inventive concept.

What is claimed is:

1. An inverter for positioning in association with a moving main conveyor belt to invert a package being moved by the main conveyor belt, the inverter comprising:

a frame for positioning adjacent the main conveyor belt;

an auxiliary conveyor movably mounted on the frame, the auxiliary conveyor having a pick-up end for receiving a package from the main conveyor belt and a discharge end for discharging the package back onto the main conveyor belt, the discharge end being located at a point spaced vertically above the pick-up end and the main conveyor belt, the auxiliary conveyor operable for moving along an upwardly inclined path from the pick-up end to the discharge end to move said package and discharge the package from an elevation above the main conveyor belt;

a fulcrum element proximate said discharge end and horizontally spaced downstream from said discharge end for catching a forward end of said package and temporarily supporting said package off center until a trailing end of said package moves off the discharge end such that the package temporarily rocks on the fulcrum element and falls from the fulcrum element with the package trailing end falling forward of the package forward end to thereby invert the package as it is discharged back onto said main conveyor belt.

2. The inverter of claim 1, the auxiliary conveyor further comprising at least one continuous driven belt for frictionally engaging said package at said pick-up end and conveying the package from the pick-up end to the discharge end.

3. The inverter of claim 2 wherein said continuous belt moves on a plurality of pulleys carried by said frame.

4. The inverter of claim 2, the auxiliary conveyor further comprising a second belt moving generally parallel the first belt to engage the package at two positions and smoothly convey the package.

5. The inverter of claim 4 wherein said auxiliary conveyor belts are positioned one on either side of the main conveyor belt to straddle the main conveyor belt and receive said package from the main conveyor belt.

6. The inverter of claim 1 further comprising a drive mechanism for engaging the moving main conveyor belt and driving the auxiliary conveyor to convey said package.

7. The inverter of claim 6 wherein the drive mechanism includes a drive roller which contacts and is rolled by the moving main conveyor belt to drive the auxiliary conveyor.

8. The inverter of claim 7, the auxiliary conveyor comprising at least one continuous belt for frictionally engaging said package and conveying the package, the belt coupled to and driven by said drive roller.

9. The inverter of claim 7 wherein the drive roller includes at least one friction belt extending around the roller for contacting the main conveyor belt.

10. The inverter of claim 1 further comprising a deflector chute proximate the discharge end to catch the falling trailing end of the package and guide it forward of the package forward end to smoothly invert the package.

11. The inverter of claim 1 wherein the pick-up end of the auxiliary conveyor is positioned below the main conveyor belt to smoothly receive the package from said main conveyor belt.

12. The inverter of claim 1 wherein the fulcrum element is horizontally spaced from the discharge end of the auxiliary conveyor a horizontal distance equal to or greater than approximately 50 percent of the distance between the forward end and trailing end of the package such that the package is supported off center by the fulcrum element.

13. The inverter of claim 1 further comprising package guides positioned on opposing sides of said main conveyor belt below said discharge end to guide and position said package as it is discharged onto the main conveyor belt.

14. The inverter of claim 1 further comprising adjustable mounting guides for engaging a main conveyor frame carrying said main conveyor belt to fix the inverter frame to said main conveyor frame, the inverter frame rotatable on said mounting guides for pivoting with respect to said main conveyor frame to be lifted partially away from the main conveyor frame and moved with respect to said main conveyor frame to vary the location of the inverter along the conveyor belt.

15. The inverter of claim 1 further comprising a second main conveyor belt travelling generally parallel the first conveyor belt to convey the package, the auxiliary conveyor including at least one continuous driven belt for frictionally engaging said package at said pick-up end and conveying the package from the pick-up end to the discharge end, the main conveyor belts being positioned one on either side of the auxiliary conveyor belt to straddle the auxiliary conveyor belt such that the auxiliary conveyor belt receives said package from the main conveyor belts.

16. The inverter of claim 1 wherein the auxiliary conveyor includes at least one continuous driven belt and a motor for engaging said auxiliary conveyor belt and driving the belt along said upwardly inclined path.

17. The inverter of claim 1 wherein the auxiliary conveyor moves faster than the main conveyor belt.

18. A method of inverting a package as it moves along a main conveyor belt comprising:

removing said package from the main conveyor belt at a pick-up position;

conveying the package along an upwardly inclined path from the pick-up position to a discharge position located vertically above said pick-up position;

discharging said package from the discharge position such that the package falls from the discharge position back onto the main conveyor belt;

catching a forward end of said package with a fulcrum element when the package is discharged and temporarily supporting the package on the fulcrum element, the fulcrum element being horizontally spaced from said discharge position such that the package temporarily rocks off center on the fulcrum element and falls rearwardly from the fulcrum element back onto the main conveyor belt with a trailing end of the package falling forward of the package forward end to thereby invert the package as it is discharged onto the main conveyor belt.

19. The method of claim 18 further comprising conveying the package along said upwardly inclined path with at least one moving conveyor belt.

20. The method of claim 18 further comprising engaging the conveyor surface with a drive roller such that movement of the conveyor turns the roller and drives an auxiliary conveyor to convey the package along said upwardly inclined path.

21. The method of claim 18 further comprising catching the trailing end of the package with a deflector chute as the package falls rearward to guide the trailing end forward of the package forward end to smoothly invert the package.

22. The method of claim 18 further comprising engaging opposing sides of said package when the package falls back onto the main conveyor belt to position the package on the main conveyor belt.

23. The method of claim 18 further comprising catching the package forward end with a fulcrum element which is horizontally spaced from said discharge position a distance equal to or greater than approximately fifty percent (50%) of the distance between the trailing end and forward end of the package to ensure that the package is supported off center by the fulcrum element.

* * * * *